(12) United States Patent
Gase

(10) Patent No.: US 6,184,996 B1
(45) Date of Patent: *Feb. 6, 2001

(54) NETWORK PRINTER WITH REMOTE PRINT QUEUE CONTROL PROCEDURE

(75) Inventor: Stephen T. Gase, Boise, ID (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/879,247

(22) Filed: Jun. 18, 1997

(51) Int. Cl.[7] .................................................... G06F 15/00
(52) U.S. Cl. ........................................ 358/1.15; 358/1.16
(58) Field of Search .................................... 395/112, 114, 395/115, 826, 859, 874, 200.48, 101; 358/1.13, 1.15, 1.16, 1.17, 1.14, 1.1, 1.2, 1.6, 1.9, 1.11, 1.18, 407, 404, 444, 468, 434–439; 710/6, 39, 54, 15, 18, 19, 40, 52; 709/218, 103, 203, 207

(56) References Cited

U.S. PATENT DOCUMENTS

| 5,754,774 | * | 5/1998 | Bittinger et al. ...................... 709/203 |
| 5,787,237 | * | 7/1998 | Reilly ..................................... 395/112 |
| 5,804,803 | * | 9/1998 | Cragun et al. ........................ 235/375 |
| 5,946,458 | * | 8/1999 | Austin et al. ......................... 358/1.15 |

OTHER PUBLICATIONS

"Adobe Strikes Back in Language Battle With New Web–Savvy PostScript Level 3", Hard Copy Observer, Sep. 1996, pp 1, 24, 25.
"Pipeline's Internet Printing System Lets Printer Surf the Web", Hard Copy Observer, Mar. 1997, pp 45, 46.

* cited by examiner

Primary Examiner—Dov Popovici

(57) ABSTRACT

The method of the invention enables remote control of a print queue in a network printer which receives print jobs over the Internet from plural client processors. The network printer includes a server procedure which enables transfer of files from the network printer over the network and a browser procedure which enables retrieval of files from client processors over the network. The method includes the steps of: establishing a queue of received print job identifiers; employing the server procedure to provide a first file to a client processor to enable the client processor to transmit a status request concerning the print queue; receiving a message including the status request and transmitting, in response, a second file with queue data to the client processor, the second file further including queue alteration choices; receiving a response message from the client processor with at least one queue alteration value; and altering the queue accordingly. The method further includes the step of responding to a received URL from a scanner, by employing the browser procedure to retrieve a text file identified by the URL.

12 Claims, 3 Drawing Sheets

PRINTER HOME PAGE

PRINTER TYPE:

ADDRESS:

CAPABILITIES:

ppm:

CONTRA LANGUAGE:

MEMORY:

⋮

PRINTER JOBS LIST

| ID | DESCRIPTION | STATUS | OWNER |
|----|-------------|--------|-------|
| 10 | SPREAD SHEET | PRINTED | STEVE |
| 11 | LETTER | PRINTING | JEFF |
| 15 | DOCUMENT X | QUEUED | SAM |
| 20 | DOCUMENT Y | QUEUED | ROB |

PRINTER JOB DETAIL

JOB: 15

STATUS: QUEUED

QUEUE POSITION: #3

PAGES PRINTED: NONE

URL: http: // ins / default: htm

JOB DESCRIPTION: DOCUMENT X

OWNER: SAM

COPIES: 2

NETWORK PRINTER WITH REMOTE PRINT QUEUE CONTROL PROCEDURE

FIELD OF THE INVENTION

This invention relates to printers that are particularly adapted to being connected to an Internet port and, more particularly, to a network printer which includes procedures that enable remote client processors to control print jobs that are queued for printing on the network printer.

BACKGROUND OF THE INVENTION

The Internet and its associated worldwide web (WWW) are well-known and established communication networks. Increasingly, business applications are employing the worldwide web to transfer print jobs from client processors to network printers that are remotely located. A significant feature of the worldwide web is that it offers a common interface which enables computing devices that are controlled by different operating system platforms to communicate and to be understood by each other. This communication capability arises as a result of each of the operating system platforms having program modules which enable the devices to communicate via the common messaging protocol used over the worldwide web.

That protocol is termed the "HyperText Transfer Protocol" or HTTP. HTTP provides a way for WWW clients and servers to communicate, primarily through the exchange of messages that are brief and direct. HTTP employs specific message categories, i.e.: a "connection"; a "request"; a "response" and a "close". A connection is a message which occurs as a client tries to connect to a specific web server. As will be understood from the description below, a network printer which incorporates the invention operates as a web server and is accessed by client processors.

A request is when a client processor asks for a web resource it is looking for. Such request includes the protocol to be used, the name of the object being sought (i.e. its universal resource locator or URL), and information about how the server should respond to the client processor.

A response is a server's message which responds in the manner requested by the client processor and delivers the requested data. A close occurs after the information has been transferred in response to the request. The connection can then be re-opened with another request, for example, by clicking on a link in a current web page.

An Internet printing system, recently announced by the Pipeline Corporation (see "The Hard-Copy Observer", pages 45, 46, March 1997), describes a network printer that includes functions which enable a URL of a print job to be received. The printer's home page includes a field that allows a user to enter URLs of desired pages to be printed. The printer includes scheduling software which allows a user to program the printer to periodically access a prescribed list of web sites and to automatically print the pages it finds there. The system also enables the printer to be programmed to retrieve and print pages that are hyperlinked to an original document, down a specified number of link levels.

Because many client processors can access network printers over the worldwide web, such a printer must have an ability to establish a queue for received print jobs so as to enable such print jobs to be handled in an orderly manner. It is desirable, however, that client processors have an ability to view the printer's print queue and, to access information regarding the status of each print job on the print queue.

Further it is desirable that a client processor have an ability, if authorized, to alter the print queue. Such a capability will enable the print queue to be a "universal queue" that is accessible by any number of client processors and will enable each client processor to render an informed decision regarding whether it wishes to use the particular network printer. Also, the capability will provide an ability to remotely modify the print queue, in accordance with preassigned priority client queue management rights.

Accordingly, it is an object of this invention to provide a network printer with a capability to establish a universal print queue.

It is another object of this invention to provide a network printer with an ability to report print queue status data to client processors.

It is yet another object of this invention to provide a network printer with an ability to respond to HTTP-configured messages and to both report print queue status and to retrieve print jobs in response thereto.

It is yet another object of this invention to enable a scanner device attached to the WWW to provide a URL indicator to a printer and for the printer to respond by accessing a scanned image.

SUMMARY OF THE INVENTION

The method of the invention enables remote control of a print queue in a network printer which receives print jobs over the Internet from plural client processors. The network printer includes a server procedure which enables transfer of files from the network printer over the network and a browser procedure which enables retrieval of files from client processors over the network. The method includes the steps of: establishing a queue of received print job identifiers; employing the server procedure to provide a first file to a client processor to enable the client processor to transmit a status request concerning the print queue; receiving a message including the status request and transmitting, in response, a second file with queue data to the client processor, the second file further including queue alteration choices; receiving a response message from the client processor with at least one queue alteration value; and altering the queue accordingly. The method further includes the step of responding to a received URL from a scanner, by employing the browser procedure to retrieve a print job from the scanner that is identified by the URL.

DETAILED DESCRIPTION OF THE INVENTION

Figure 1:
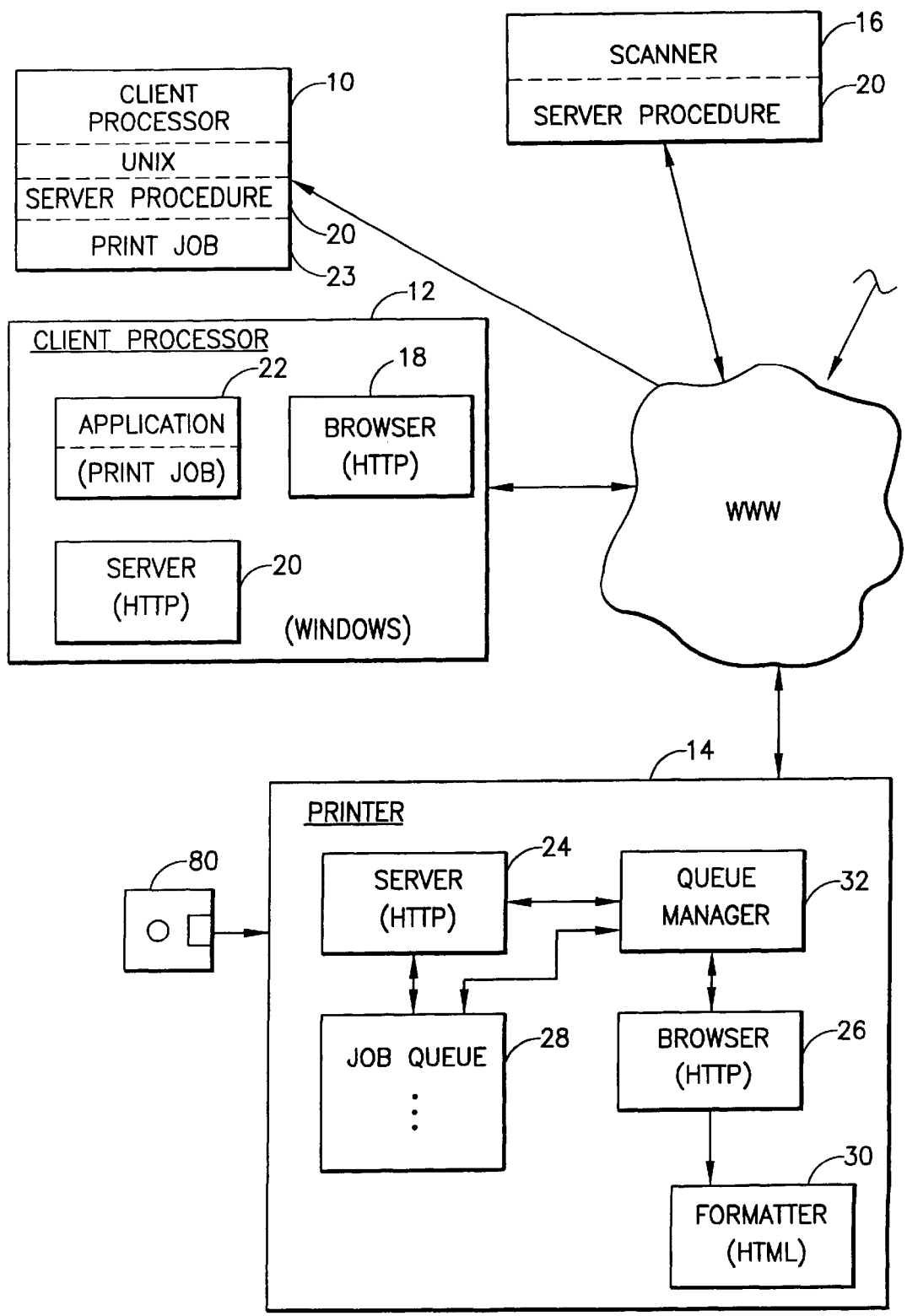
FIG. 1 is a schematic system diagram illustrating the relationship of a printer incorporating the invention to plural client processors and a scanner, all of which communicate over the WWW.

Turning to FIG. 1, plural client processors 10, 12, ... etc. are coupled to the WWW and are thus able to communicate with a network printer 14. A scanner 16 is also coupled to the WWW and communicates with network printer 14. Each client processor (i.e., 10, 12, . . . ) includes a browser procedure 18 and a server procedure 20. Scanner 16 includes only a server procedure 20. Further, each client processor includes an application 22 which may have a print job ready for submission to printer 14. A client processor (e.g., 12) may wish to have a print job 23 that is present in another client processor (e.g., 10) submitted to printer 14 for printing. In the alternative, a user at a client processor may wish to view the status of print jobs queued on printer 14 and to alter the queue status of one or more such print jobs.

Accordingly, printer 14 is also provided with a server procedure 24 and a browser procedure 26. Server procedure 24 provides a print job management function for printer 14 and is further used to respond to request messages from one or more client processors. Browser procedure 26 enables printer 14 to respond to a received URL by accessing, via the WWW, the print job designated by the URL. The URL may designate a print job residing at any client, whether it is the client which originated the message with the URL or any other client. The responses transmitted by browser 26 are formatted in a formatter module 30, using the HTML or any other formatting procedure.

Printer 14 further includes a job queue 28 which lists the URL's of received print jobs. Upon a URL being reached on job queue 28, printer 14 causes browser 26 to transmit a request to the client processor wherein the specific print job corresponding to the URL is located. The client processor then responds with the text of the print job, which text is then printed by printer 14.

Job queue 28 is managed by a queue manager 32 which maintains status data and controls the position of each of the URLs listed on job queue 28. Queue manager 32 is further enabled to rearrange the listed URLs in accordance with received commands that appear on a web page transmitted from a client processor.

Figure 2:
FIG. 2 illustrates a home page provided by the printer of FIG. 1, in response to a message from a client processor.
Figure 2:
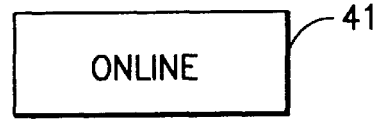
Figure 2:
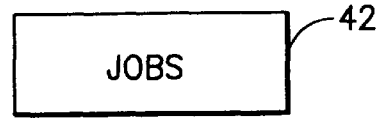
Figure 2:
Figure 2:
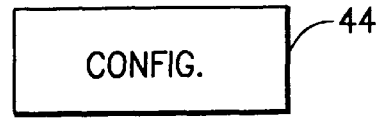

Server procedure 24 maintains a "home page" which is shown in FIG. 2. The home page is the default page which is transmitted by server 24 to an inquiring client processor that has transmitted a request to printer 14. The home page provides data regarding the properties of printer 14, such as its WWW address, capabilities, whether it is on-line, etc. The home page also provides further virtual buttons 40–44 which enable a linking to other pages and provide a capability to cause the printer to: respond with its properties (button 40); come on-line (button 41); provide a listing of jobs that are present on job queue 28 (button 42); provide a diagnostic procedure for remotely diagnosing a problem within printer 14 (button 43); and provide further configuration information (button 44).

Figure 3:
FIG. 3 is a further printer web page illustrating a queue of print jobs awaiting printing in the printer of FIG. 1.

Upon receiving the home page from printer 14, a user at a client processor may wish to view the jobs that are presently listed on job queue 28. To obtain a web page illustrating the jobs queued on job queue 28, the user clicks on job's button 41 which causes a request message to be transmitted back to printer 14, with a code indicating a request to provide the "job's list" page shown in FIG. 3.

The job's list page includes an identifier for each job (e.g., the job's URL); a description of the job; the status of the job (i.e., is it printing, printed, queued, etc.) and the owner of the job. At the bottom of the job's list page is a virtual button 50 which enables the user at the client processor to access further printer pages. If virtual "select job" button 50 is selected by a mouse click and then a cursor is placed at a job entry, followed by a mouse click, a "job detail" page is produced.

Figure 4:
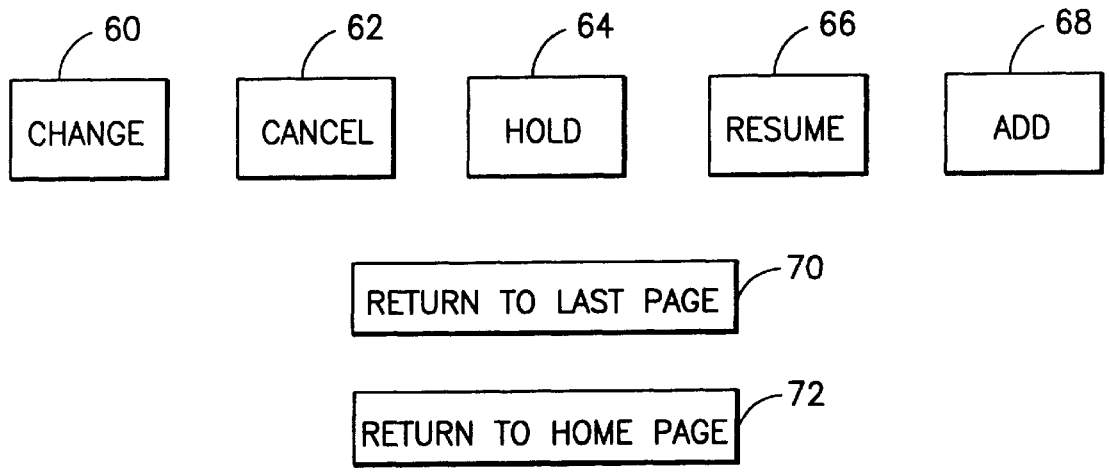
FIG. 4 is a further printer web page illustrating job detail of any selected job listed in the print queue of FIG. 3, and further showing various queue alteration actions which are available to a client processor.

More specifically, upon a user at a client processor selecting a particular job in the job's list page, a request message is sent to printer 14 which is received by server 24. Server 24, in turn, queries queue manager 32 for details of the selected job. A job detail page is then constructed, as shown in FIG. 4, with details of the selected job. The job detail page is then dispatched as a response message to the originating client processor.

The job detail page enables the originating client processor to exert control over job queue 28 and the details of the specific job shown in the received job detail page. More specifically, by clicking one of the entries on the job detail page, an entry can be highlighted and altered. Thus, as shown in FIG. 4, not only is the identity of the job indicated, but its state; the number of pages printed; the URL of the job; the job description; the owner; and the number of copies required. At the bottom of the job detail page are a number of virtual buttons which enable a job entry parameter to be altered.

Change button 60 enables the alteration of a highlighted field on the page that has been previously selected by the user at the client processor. For instance, if it is desired to change the number of copies, the "copies" line is highlighted, followed by a clicking on "change" button 60, after which the number of copies can be altered. Change button 60 may also be used to modify the queue position of a job listed on job queue 28. To accomplish such a unilateral change in position, the client processor must have been previously provided with an assigned priority level which enables its print jobs to enjoy a higher priority status than other print jobs on job queue 28 that are to be "pushed down" in favor of the client processor's print job. In such case, change button 60 enables a print job from the higher priority client processor to be repositioned on job queue 28 to a position just prior to a print job of equal or higher priority, as the case may be.

By clicking on "cancel" button 62, a selected job can be canceled in its entirety. By clicking on "hold" button 64, the position on job queue 28 of a selected job will not be advanced, notwithstanding the completion of jobs higher up on the queue. The clicking of "resume" button 66 negates the hold status and enables a continued movement of the print job on job queue 28. "Add" button 68 enables a message to be sent to printer 14 to provide a blank "Printer job detail" page, which will enable a new job to be entered by the user.

Buttons 70 and 72 enable messages to be transmitted to printer 14 to cause a re-transmission of either a last transmitted web page or the printer's home page.

Returning to FIG. 1, scanner 16 is also provided with a server procedure 20 which enables scanner 16 to transmit a URL of a scanned document text file to a printer 14. Such transmission occurs after scanner 16 has scanned and stored a document and the document is now to be printed. Upon receiving the URL, printer 14 causes browser procedure 26 to transmit a request message to scanner 16 which requests that the text file be appended to the response message and re-transmitted back to printer 14. Accordingly, scanner 16 formats the response page from printer 14 by appending the scanned document text file and transmitting the page and text file to printer 14 for printing. Accordingly, printer 14 executes a file "pull" action upon the data stored in scanner 16, thereby enabling the text file to be downloaded to printer 14 and eventually printed.

While the procedures which control printer 14, i.e., server procedure 24, browser procedure 26, formatter procedure 30 and print queue manager 32 have been described as already having been loaded onto printer 14, one skilled in the art will realize that such procedures are initially loaded by insertion of one or more memory disks 80 (FIG. 1) into a disk drive read/write assembly (not shown) associated with printer 14. Accordingly, the invention encompasses not only the above-described software procedures when incorporated into printer 14, but also when such procedures are incorporated onto a magnetic disk which is used to control various instrumentalities within printer 14.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for enabling control of a network printer which receives print jobs over a network from plural client processors, said network printer including a server procedure for enabling transfer of files from said network printer over said network and a browser procedure for enabling retrieval of files to said network printer over said network, said method comprising the steps of:
    a) establishing a queue of received print job identifiers;
    b) employing said server procedure to provide a first web page to a client processor to enable said client processor to transmit a status message concerning said queue, at least some of said plural client processors having been previously provided with an assigned priority level;
    c) receiving said status message and enabling said server procedure to transmit a response comprising a second web page with queue data to said client processor, said second web page further including at least a queue position alteration choice;
    d) receiving a further response message from said client processor with at least one queue position alteration value and altering said queue in accordance with said queue position alteration value and said previously assigned priority level of said at least some of said plural client processors; and
    e) employing said browser procedure of said network printer to retrieve a print job listed on said queue by a print job identifier.

2. The method as recited in claim 1, wherein said further response message comprises a list of print jobs on said queue and status indications for each said print job.

3. The method as recited in claim 2, wherein said status indications comprise at least one of: printing status, print job owner, order of jobs to print and expected time to print.

4. The method as recited in claim 1, wherein said response includes queue alteration values for print jobs listed on said queue that comprise at least one of: deleting a print job, reordering the print jobs, delaying a print job, resuming a print job and changing attributes of a print job.

5. The method as recited in claim 1, wherein said first web page and said second web page are each identified by a Universal Resource Locator identifier.

6. The method as recited in claim 1, wherein said server procedure and said browser procedure operate in accordance with a Hypertext Transfer Protocol.

7. A memory media including procedures for controlling a network printer which receives print jobs over a network from plural client processors, said network printer including a server procedure for enabling transfer of files from said network printer over said network and a browser procedure for enabling retrieval of files to said network printer over said network, said memory media comprising:
    a) means for controlling said network printer to establish a queue of received print job identifiers;
    b) means for controlling said network printer to employ said server procedure to provide a first web page to a client processor to enable said client processor to transmit a status message concerning said queue, at least some of said plural client processors having been previously provided with an assigned priority level;
    c) means for controlling said network printer to receive said status message and to enable said server procedure to transmit a response comprising a second web page with queue data to said client processor, said second web page further including at least a queue position alteration choice;
    d) means for controlling said network printer to receive a further response message from said client processor with at least one queue position alteration value and to alter said queue in accordance with said queue position alteration value and said previously assigned priority level of said at least some of said plural client processors; and
    e) means for controlling said network printer to employ said browser procedure of said network printer to retrieve a print job that is listed on said queue.

8. The memory media as recited in claim 7, wherein said further response message comprises a list of print jobs on said queue and status indications for each said print job.

9. The memory media as recited in claim 9, wherein said status indications comprise at least one of: printing status, print job owner, order of jobs to print and expected time to print.

10. The memory media as recited in claim 7, wherein said response includes queue alteration values for print jobs listed on said queue that comprise at least one of: deleting a print job, reordering the print jobs, delaying a print job, resuming a print job and changing attributes of a print job.

11. The memory media as recited in claim 7, wherein said first web page and said second web page are each identified by a Universal Resource Locator identifier.

12. The memory media as recited in claim 7, wherein said server procedure and said browser procedure operate in accordance with a Hypertext Transfer Protocol.

* * * * *